United States Patent [19]

Edwards et al.

[11] 4,063,565

[45] Dec. 20, 1977

[54] APPARATUS FOR WASHING AND/OR TREATING POTATOES AND OTHER SUCH FRUITS AND VEGETABLES

[76] Inventors: Dalma Therman Edwards; C. Gene Strickland, both of Spring Hope, N.C.

[21] Appl. No.: 653,363

[22] Filed: Jan. 29, 1976

[51] Int. Cl.² ............................................. B08B 3/04
[52] U.S. Cl. ..................................... 134/104; 134/79; 134/134; 134/165; 134/198; 209/173; 209/257
[58] Field of Search ............... 134/104, 134, 182, 198, 134/165, 60, 66, 78–79, 83; 209/173, 255, 257, 268, 463, 464

[56] References Cited

U.S. PATENT DOCUMENTS

| 790,580 | 5/1905 | Kurtz | 134/134 X |
| 2,240,442 | 4/1941 | Paul | 134/104 UX |
| 2,752,040 | 6/1956 | Schreiber et al. | 209/173 |
| 3,877,110 | 4/1975 | McCloskey et al. | 209/173 X |

FOREIGN PATENT DOCUMENTS

| 617,012 | 8/1935 | Germany | 209/173 |
| 1,950,918 | 4/1971 | Germany | 134/104 |

*Primary Examiner*—Robert L. Bleutge
*Attorney, Agent, or Firm*—Mills & Coats

[57] ABSTRACT

The present invention relates to a fluid containing apparatus for receiving potatoes or other such fruits and vegetables wherein the received material is washed and/or treated by the contained fluid, after which the material is transferred from said apparatus by a driven paddle wheel assembly including a plurality of circumferentially spaced finger assemblies that engage the material within the apparatus and lift the material upwardly towards an exiting edge of said apparatus in a generally arcuate path motion, where the material is deposited onto an adjacent conveyor or otherwise received by some other appropriate receiving structure disposed adjacent to the apparatus.

16 Claims, 8 Drawing Figures

APPARATUS FOR WASHING AND/OR TREATING POTATOES AND OTHER SUCH FRUITS AND VEGETABLES

The present invention relates to material handling devices, and more particularly to a fruit and vegetable washing and/or treating apparatus adapted to contain a volume of fluid material therein wherein fruits or vegetables or other like articles are deposited therein and allowed to move through the fluid contained within the apparatus where the same is cleaned and/or treated.

BACKGROUND OF THE INVENTION

Many fruits, vegetables and other agricultural produce require washing and/or treating after harvest prior to processing or packaging. Washing and treating such products presents a materials handling problem because many such products, especially agricultural products such as sweet potatoes are quite delicate and subject to bruising. The bruising and cutting of produce and agricultural products such as potatoes severely impairs and distracts from the overall quality of the harvested product. Thus, it is important in handling fruits and vegetables and other agricultural products such as sweet potatoes to handle them gently and carefully in such a manner that bruising, cutting and scraping of the products is minimized.

In the case of processing sweet potatoes, it is a known practice that after the sweet potatoes are harvested from the field they are transferred to a processing station where the sweet potatoes are first washed and/or treated, and graded. In the past, various types of washing and/or treating devices have been used to wash and treat the sweet potatoes after harvesting. In some cases, the sweet potatoes are conveyed down a grading line and prior to actual grading, the sweet potatoes are washed and/or treated by spraying nozzles that inject a cleaning and/or treating fluid downwardly onto the sweet potatoes passing thereunder on the grading conveyor system.

In addition, it has been known to dump the potatoes into a large vat containing the cleaning or treating fluid, where the potatoes are conveyed by a separate and independent conveying system through the vat by a vertically adjustable conveyor assembly that may be lowered and raised from the vat. Besides being quite expensive, this type of cleaning and treating apparatus is especially difficult to clean in that the conveyor assembly must be raised entirely from the vat before the same can be thoroughly cleaned. After this, workers usually hose down the bottom of the vat and collect the dirt, debris and other foreign material that have been separated from the sweet potatoes during the cleaning and/or treating process. Also, the separable conveyor assembly is relatively large and presents problems in raising and lowering the same with respect to the vat, besides the difficulty presented with driving the entire conveyor assembly and being able to raise and lower the conveyor assembly without disrupting or damaging the drive train connected thereto for driving the same.

Thus, it is well apparent that a need exists for a relatively simple sweet potato (or other agricultural crop product) cleaning and/or treating container structure that is relatively simple and inexpensive, but yet has the ability to receive sweet potatoes or the particular agricultural product therein and to be able to handle the same in a careful and gentle manner so as to avoid bruising, cutting, and scraping.

SUMMARY OF THE INVENTION

The present invention presents an apparatus for cleaning and/or treating agricultural products and produce, including fruits and vegetables and particularly sweet potatoes, wherein the product of concern is deposited within one end of the apparatus containing a fluid such as water combined with a cleansing and/or treating substance. Once desposited in the apparatus at one end, the products deposited tend to move from that end through the fluid under the influence of gravity or by the urgence from other such products being deposited or even from the pressure of water being circulated into the apparatus, towards an end portion opposite the end where the products were deposited. The end of the apparatus opposite the end where deposit was made is referred to as an exiting end and is provided with a paddle wheel conveying assembly that is adapted to gently engage the product such as sweet potatoes and to gently and continuously urge the same upwardly about a generally arcuate path from the apparatus and fluid therein to a point where the products are deposited outwardly of the cleaning and treating apparatus. In the embodiment disclosed herein, the paddle wheel is cooperable with an underlying portion of a grate that is generally arcuately shaped about a portion underneath and along one side of said paddle wheel assembly, and said paddle wheel assembly is provided with a series of circumferentially spaced finger strips that engage the products such as sweet potatoes and sweep them upwardly between the paddle wheel assembly housing and the underlying and adjacent grate until the sweet potatoes or the products reach a point at which they are discharged up and over the end side wall of the washing and/or cleaning apparatus.

It is, therefore, an object of the present invention to provide a cleaning and/or treating apparatus for fruits, vegetables, and other agricultural produce and products such as sweet potatoes, wherein the apparatus gently and carefully handles and conveys products received therein through a fluid cleaning and/or treating medium such that bruising, cutting and other related damage is minimized.

Another object of the present invention is to provide a sweet potato cleaning and/or treating apparatus that is relatively inexpensive and simple but yet has the capability to receive potatoes or other articles of produce therein and to perform a cleaning and/or treating operation thereon, after which the potatoes or other articles of produce are conveyed from the cleaning and treating apparatus in a manner that minimizes bruising and cutting of the articles of produce.

Still a further object of the present invention is to provide a sweet potato cleaning apparatus with a paddle wheel conveying assembly disposed about the exiting end thereof wherein said paddle wheel conveying assembly acts to lift, transfer, and discharge respective potatoes or articles of produce from the cleaning and/or treating apparatus.

A further object of the present invention resides in the provision of a sweet potato cleaning apparatus that includes a sloped and inclined bottom lower portion that collects the dirt, debris and other foreign matter from the sweet potatoes or other articles of produce cleaned therein, and wherein the sloped and inclined bottom floor is sloped towards a discharge opening that allows the collected dirt, debris and other foreign material to be washed downwardly towards the discharge opening and flushed therefrom by opening a gate associated with said discharge opening, thereby providing a sweet potato cleaning apparatus that is easily and conveniently cleaned itself.

Another object of the present invention resides in the provision of a sweet potato cleaning apparatus including a continuous recirculating pumping system that is adapted to continuously pump and recirculate fluid into said cleaning apparatus and is particularly provided with transverse disbursing pipes that are provided with openings therein and particularly oriented such that fluid discharged through said openings under pressure actually acts to urge the sweet potatoes or other articles of produce towards the exiting end of said apparatus where the same is conveyed and discharged therefrom.

Other objects and advantages of the present invention will become apparent from a study of the following description and the accompanying drawings which are merely illustrative of the present invention.

Figure 1:
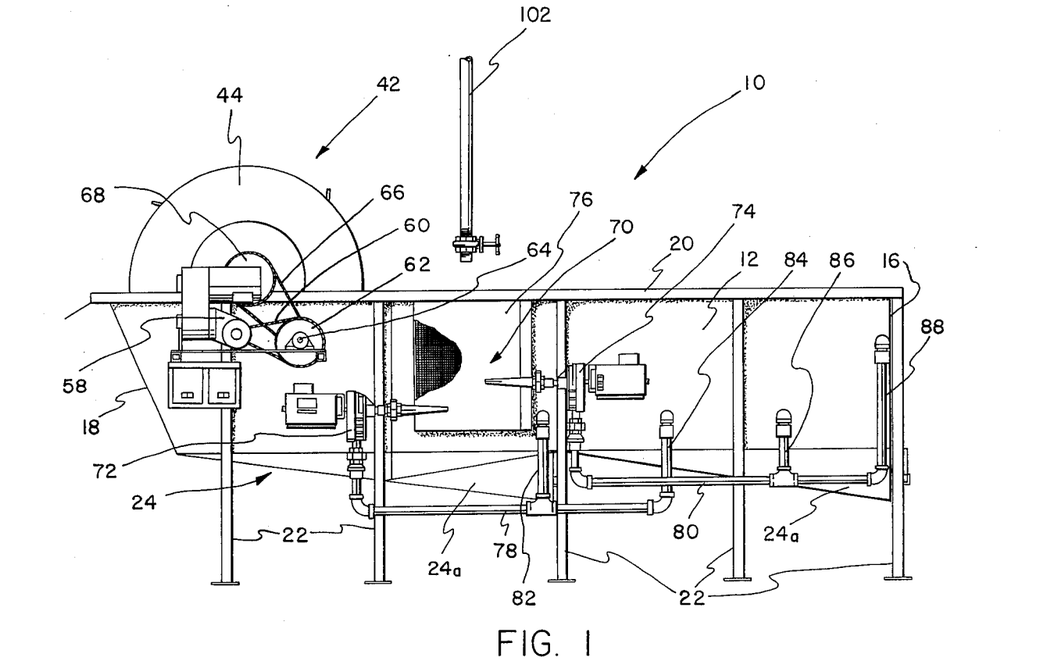
FIG. 1 is a side elevational view of the cleaning apparatus of the present invention, particularly illustrating the paddle wheel conveyor assembly disposed about the exiting end thereof and the drive therefor, along with the pumping and associated pumping system for recirculating the fluid contained within the apparatus.
Figure 2:
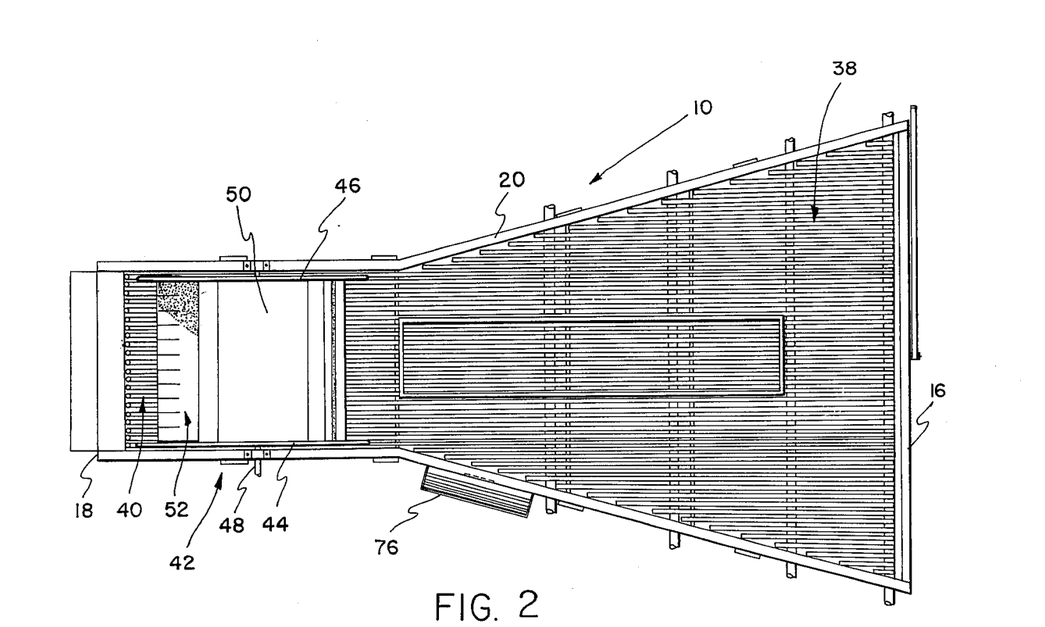
FIG. 2 is a top plan view of the cleaning apparatus shown in FIG. 1.
Figure 3:
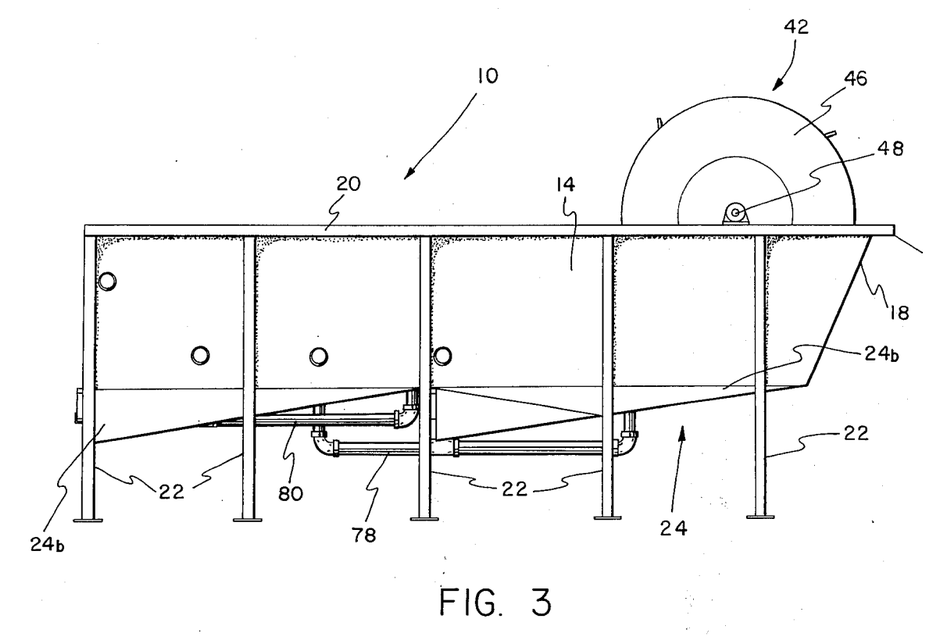
FIG. 3 is a side elevational view of the cleaning apparatus shown in FIG. 1 as viewed from the side opposite the side shown in FIG. 1.

With further reference to the drawings, particularly FIGS. 1 and 2, the cleaning apparatus of the present invention is shown therein and indicated generally by the numeral 10. As will become apparent from subsequent portions of the disclosure herein, the cleaning apparatus 10 is particularly adapted to receive and clean and/or treat fruits, vegetables and other articles of produce such as sweet potatoes or the like.

Viewing cleaning apparatus 10 in greater detail, it is seen that the same comprises a pair of side walls 12 and 14 and an inlet end 16 and an exiting end 18. Side walls 12 and 14 are integrally constructed with ends 16 and 18 to form a continuous side wall structure about a bottom floor indicated generally by the numeral 24. Thus, the side walls 12 and 14, the ends 16 and 18, and the floor 24 comprise the basic container structure that makes up the cleaning apparatus 10 and the same is adapted to contain a volume of fluid, typically water combined with a chemical cleaning or treating agent.

To support cleaning apparatus 10, there is provided a series of generally upright legs 22 that are fixed to the cleaning apparatus 10 and depend generally downwardly therefrom and from an upper border ridge 20 that extends around the side walls 12 and 14 and the respective ends 16 and 18.

Figure 4:
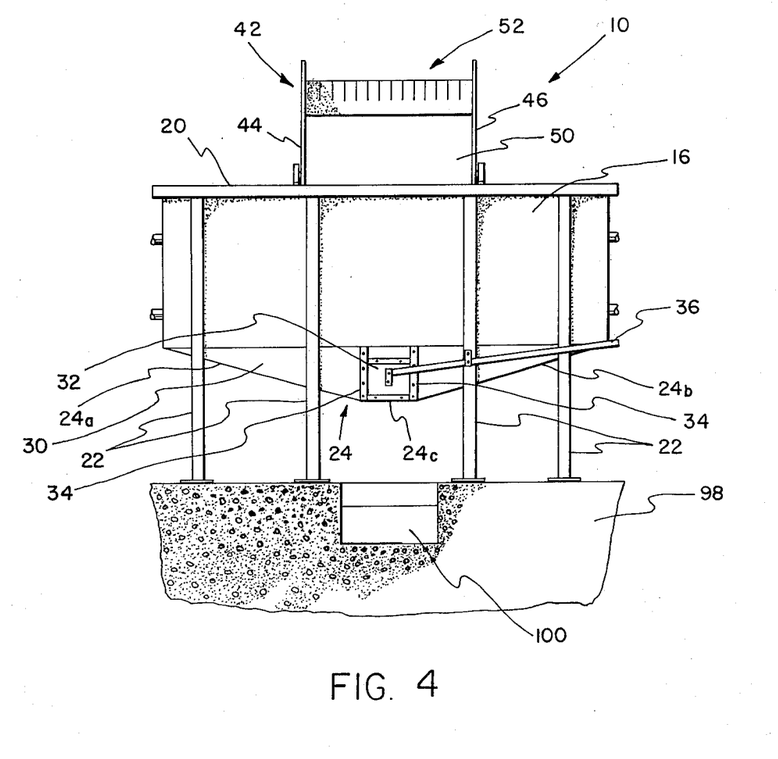
FIG. 4 is an end elevational view of the cleaning apparatus as viewed from the inlet end thereof, and particularly illustrating the inclined floor portion thereof that leads to a discharge opening having a gate associated therewith that allows dirt, debris and other foreign material to be cleaned from the floor of the cleaning apparatus and flushed into an inclined trough stationed below the cleaning apparatus.

With particular attention directed to the bottom floor 24 of the cleaning apparatus 10, it is seen that the same comprises dual clean out troughs 26 and 28. These two clean out troughs being particularly shaped about the bottom floor 24 such that the floor slants or slopes generally downwardly from the outer side walls 12 and 14 towards the central area of said cleaning apparatus to form bottom areas 24a and 24b (FIG. 4). Bottom areas 24a and 24b of each clean out trough 26 or 28 extend inwardly to a general central area that is referred to as a bottom ridge 24c. Besides sloping laterally, each clean out trough also slopes left to right as viewed in FIGS. 1 and 5, and, therefore, each clean out trough 26 and 28 is provided with a bulkhead 30. Each bulkhead is provided, as viewed in FIG. 4, with a discharge opening that is normally closed by a vertically sliding gate 32 that is held about the respective bulkhead 30 by a pair of laterally spaced gate slide guides 34. To actuate the gate 32 and to open the discharge opening within each bulkhead 30, there is provided a lever arm 36 that is pivotably mounted intermediate the ends thereof, such that, as viewed in FIG. 4, the downward movement of the lever arm 36 results in the gate 32 being raised to an open position, thereby allowing the contents disposed in the respective clean out troughs 26 or 28 to gravitate through the associated discharge opening. Clean out troughs or clean out areas 26 and 28 are particularly provided such that the entire cleaning apparatus 10 can be cleaned and flushed by spraying water into the bottom floor 24 of the cleaning apparatus 10 and causing the dirt, debris and other foreign material separated from the sweet potatoes or other articles of produce to rush into the clean out troughs and on through the respective discharge openings when the respective gate 32 is opened. This, of course, results in a very quick, simple, and convenient way to clean the cleaning apparatus 10 of the present invention.

With reference to FIG. 2, a grate assembly indicated generally by the numeral 38 is supported within the cleaning apparatus 10 above the bottom floor 24. Grate assembly 38 comprises a series of laterally spaced rods and is generally inclined downwardly from the inlet end 16 to the exiting end 18. In the case of articles of produce or sweet potatoes that are of such a variety that do not float, the inclined grate will tend to urge the articles of produce or the sweet potatoes downwardly towards the exiting end 18 where they will be transferred and discharged from the cleaning apparatus 10, in accordance with subsequent portions of the present disclosure. It will be appreciated that the particular shape of the container or cleaning apparatus 10 can vary in accordance with certain applications, but in the case of the present embodiment, the grate portion 40 disposed about the exiting end 18 and indicated generally by the numeral 40 is generally arcuate shaped in that the rods comprising the grate 40 generally tend to curve upwardly along and adjacent the exiting end 18. The significance of this arcuate curved grate portion 40 will become more apparent in subsequent portions of the present disclosure that discuss the manner of transfer and discharge from the exiting end 18 of the cleaning apparatus.

Figure 5:
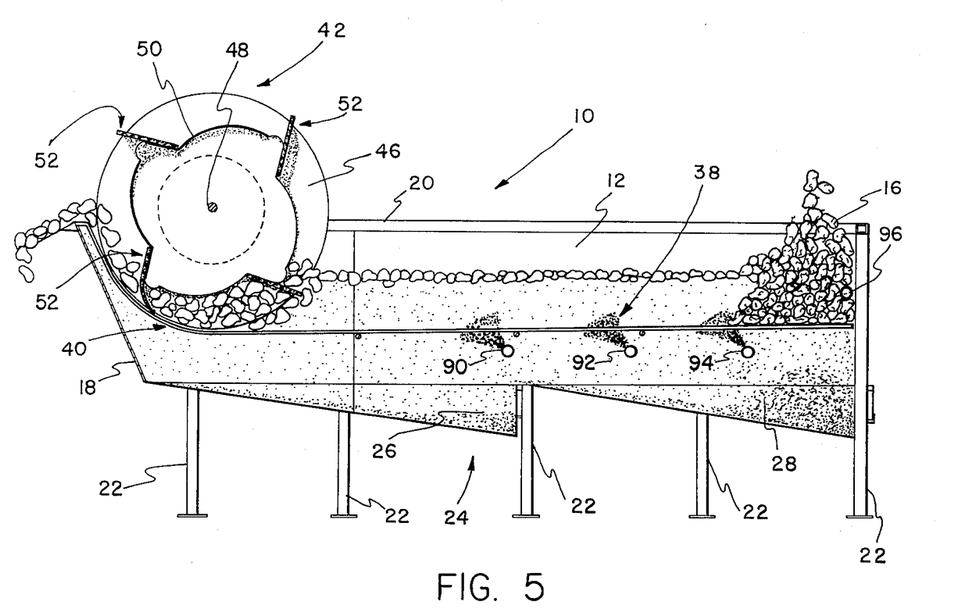
FIG. 5 is a side elevational view of the cleaning apparatus of the present invention with a side wall removed to better illustrate the flow of sweet potatoes or other articles of produce through the cleaning apparatus.
Figure 6:
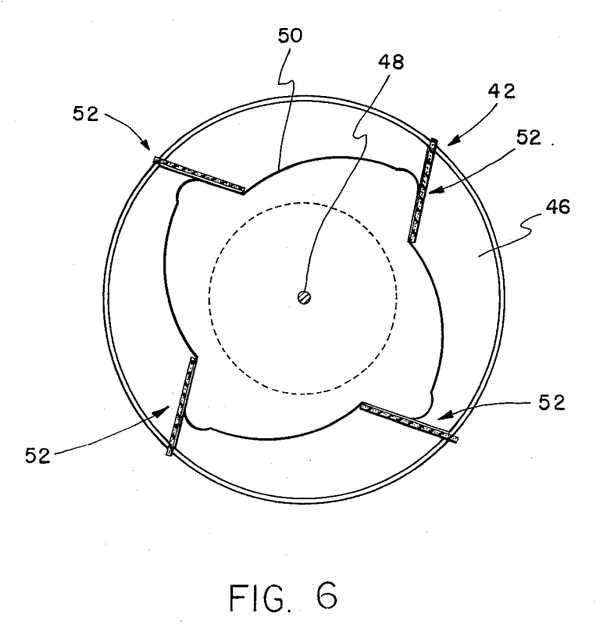
FIG. 6 is a side sectional view of the paddle wheel conveying assembly disposed about the exiting end of said cleaning apparatus.
Figure 7:
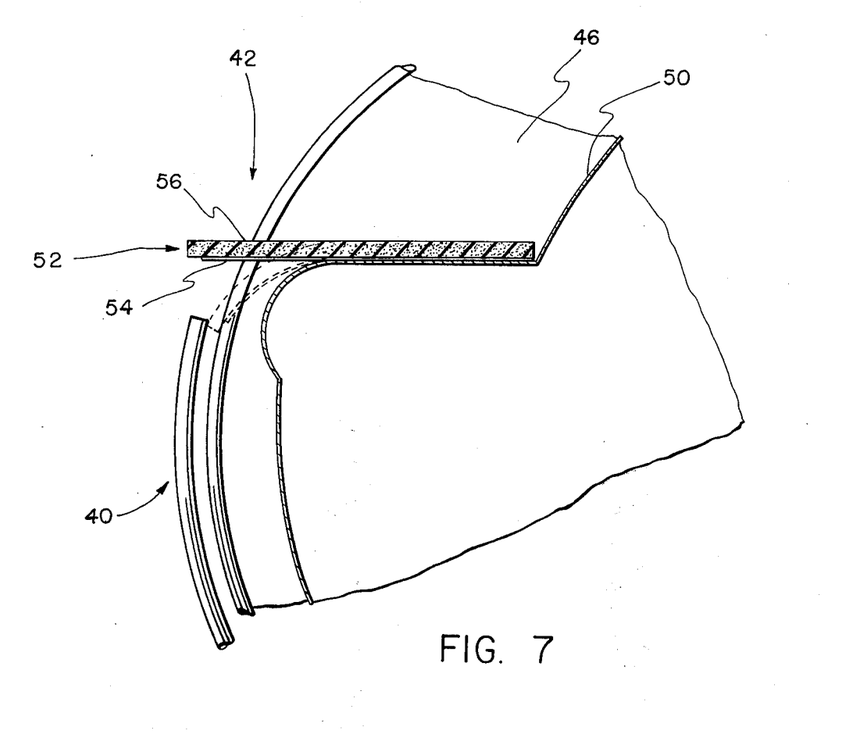
FIG. 7 is a fragmentary side sectional view of the paddle wheel conveying assembly, particularly illustrating the flexible conveying fingers thereof and the cooperable relationship with the adjacent and underlying generally arcuate shaped grate that cooperates with said paddle wheel assembly to convey and discharge the product of concern from said cleaning apparatus.
Figure 8:
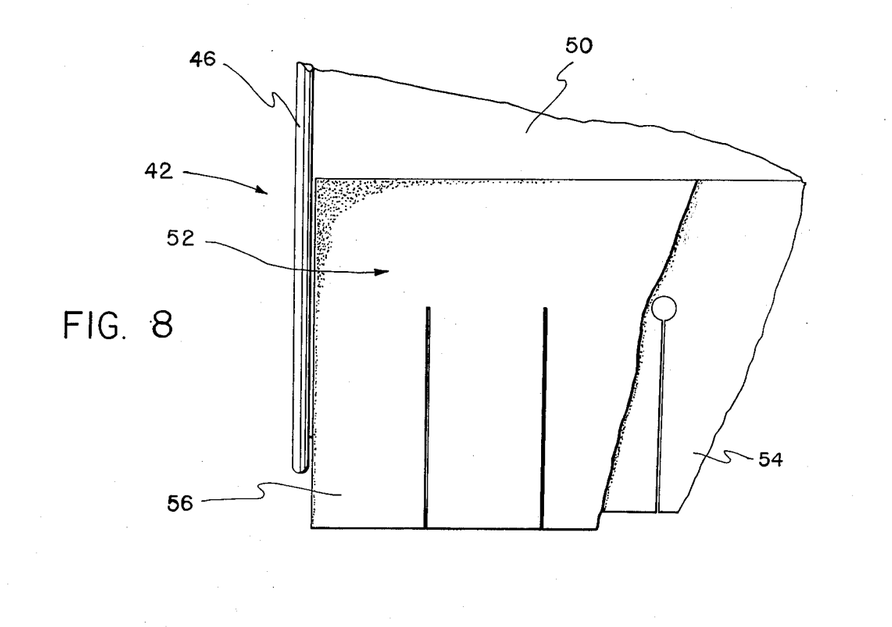
FIG. 8 is a fragmentary plan view of a portion of a transverse finger assembly that is carried and supported by said paddle wheel conveying assembly.

Turning now to a discussion of the transfer and discharge of sweet potatoes or other articles of produce received by said cleaning apparatus, it is seen that a paddle wheel conveying means, indicated generally by the numeral 42, is disposed transversely about the exiting end 18 of the cleaning assembly 10 and is particularly adapted to be driven in a clockwise fashion as viewed in FIGS. 1 and 5. With particular reference to the paddle wheel conveying means 42, it is seen that the same comprises a pair of laterally spaced circular end plates 44 and 46 secured about opposite portions of a shaft 48 rotatively journaled about the top border area 20 of sides 12 and 14. End plates 44 and 46 are disposed such that the outer side thereof lies just inwardly of the plane of the adjacent respective side wall 12 or 14. Secured between end plates 44 and 46 is an irregular shaped closed housing 50 that is referred to as a finger support assembly. Circumferentially spaced about the enclosed housing 50 and extending therefrom is a series of finger means 52 that are generally plyable and resilient and extend a sufficient distance such that when the paddle wheel conveying assembly 42 is journaled for rotation about the exiting end 18 of the cleaning assembly 10, the outer end of the finger means 52 will engage the underlying and adjacent arcuate shaped grate portion 40 during a portion of each revolution of said paddle wheel conveying assembly 42, resulting in the finger means 52 being bent back slightly during a portion of each rotation of said paddle wheel conveying assembly 42, as indicated in dotted lines in FIG. 7.

The finger means 52 in the case of the embodiment shown comprise four generally equally spaced finger rows, each finger row extending substantially the entire width between end plates 44 and 46, and comprising a relatively thin metal strip 54 that is slitted along the transverse width thereof. Although various metal like materials may be used, it has been found that a relatively thin spring stainless steel type of material is particularly suitable in that it can withstand the stress and strains placed thereon during continuous operation when the same must flex back and forth during the transfer and discharge operations. Disposed across the slitted relatively thin strip of metal 54 is a relatively soft material, preferably of a foam type of material such as "Ethel foam" produced by Dow Chemical Company. The generally foam type material is also slitted in increments that generally correspond to the slits in the underlying relatively thin metal strips.

As viewed in FIG. 5, the clockwise movement of the paddle wheel conveying assembly 42 results in the finger means 52 engaging the sweet potatoes or articles of produce at about the 4 o'clock position. Once a particular finger means 52 reaches this position, the continuous clockwise movement of the paddle wheel conveying assembly 42 results in the finger means 52 urging a quantity of sweet potatoes or articles of produce generally downwardly between the irregular shaped housing 50 preceding that respective finger means and the underlying grate structure 40. At about the 5 or 6 o'clock position, the particular finger means 52 engages the underlying grate structure 40 and from that point on a quantity of sweet potatoes or articles of produce is confined between that finger means 52 and the preceding finger means, and between the grate 40 and the enclosed housing 50, as best viewed in FIG. 5. Therefore, the continuous clockwise movement of the paddle wheel conveying assembly 42 results in the quantity of sweet potatoes or other articles of produce being swept up the arcuate shaped grate 40 by the urgence of a respective finger means 52, and about at the 9 o'clock position, the sweet potatoes or other articles of produce are discharged from the cleaning apparatus 10, again as best viewed in FIG. 5. Therefore, it is appreciated that the continuous clockwise movement of the paddle wheel conveying assembly 42 results in the sweet potatoes or other articles of produce being engaged, transferred by the lifting action of the finger means 52 in cooperation with the lower support means provided by the cooperable and underlying grate structure 40.

As mentioned hereinbefore, many varieties of sweet potatoes and other such articles of produce or vegetables, will float in the fluid contained within the cleaning apparatus 10, and will be continuously urged towards the paddle wheel conveying means 42 by simply depositing more and more such articles within the cleaning apparatus. In some cases though, the articles may be of such a variety and specific weight that they will not float and will be supported by the grate 38 or underlying articles. In such a case, the cleaning apparatus 10 of the present invention may be provided with some external conveying means or other means to induce the sweet potatoes or other articles of produce towards the paddle wheel conveying assembly. This could be done by appropriately inclining the grate assembly 38 and 40 from the inlet end 16 towards the exiting end 18.

Although various means can be provided to drive the paddle wheel conveying assembly 42, the present disclosure suggests the use of an electric motor 58 mounted adjacent side 12 of the cleaning apparatus 10 and operative to drive a drive sprocket 62 fixed to a shaft 64 via chain 60. The driving torque of shaft 64 is transferred to a driven sprocket 68 fixed to the main shaft 48 by a second chain 66 that is trained around another sprocket on shaft 64 that is disposed behind sprocket 62 and consequently not seen in FIG. 1.

It should be pointed out that the cleaning apparatus 10 in the case of processing sweet potatoes or the like is customarily used in conjunction with the grading line which is usually manned by a series of workers positioned along the grading line such that as the potatoes pass they are properly graded and in some cases actually placed in containers of the particular grade deemed appropriate by the workers. It is, of course, desirable to maintain a conveying rate down the grading line that will maintain full or near full capacity of the grading line with respect to the number of workers stationed along the grading line. But from time to time, the number of workers along the grading line will vary due to such factors as absenteeism and the switching of the individual workers from one job to another. Therefore, it is very desirable to be able to alter the conveying rate of potatoes or such articles along the grading line from time to time. With respect to the present invention, this can be accomplished by providing a variable speed drive for the paddle wheel conveying assembly 42 that allows the rotative speed of the paddle wheel conveying assembly 42 to be varied from time to time. It follows that a variance in the speed of the paddle wheel conveying assembly 42 will result in a corresponding increase or decrease in the quantity of potatoes or the like conveyed from the cleaning assembly 10 and desposited outwardly thereof onto the grading line. Such a variable speed drive could be in the form of a conventional mechanical variable speed drive assembly including a series of drive sprockets or even a variable speed sheave, a variable speed electric motor that is utilized to drive a direct chain or belt drive, a variable speed hydraulic motor operative to drive the paddle wheel conveying assembly 42, or any other suitable conventional type of variable speed drive.

As has already been discussed in the present disclosure, the cleaning apparatus 10 of the present invention can be used as a cleaning apparatus and/or a treating apparatus, in that some cases the sweet potatoes or other articles of concern need not only be cleaned but to be chemically treated. Generally, cleaning agents as well as treating agents are added to water that is directed into said cleaning apparatus 10 by a hose or other suitable water inlet means such as overhanging inlet pipe 102 shown in FIG. 1.

Cleaning apparatus 10 of the present invention is also provided with a pumping and plumbing system for continuously recirculating the fluid within the cleaning apparatus 10 during a cleaning and/or treating process. In the case of the embodiment shown, a dual pumping and recirculating system is shown as there is provided two pumps 72 and 74 appropriately driven and operatively connected to a side reservoir 76 for pumping fluid therefrom through either of two main lines 78 and 80. Main lines 78 and 80 have branching therefrom a series of intermediate connecting pipes 82, 84, 86 and 88. Each intermediate connecting pipe just referred to is operatively connected to one of a series of transversely extending dispensing pipe 90, 92, 94 and 96. Each dispensing pipe extends transversely across the cleaning apparatus at a certain depth and is provided with openings axially spaced along each pipe and generally oriented such that fluid exiting from the pipes 90, 92, 94 and 96 is generally directed at a 45 degree angle towards said paddle wheel conveying assembly 42 such that the sweet potatoes or other articles of produce contained within the fluid are urged and influenced toward said paddle wheel conveying means by the pressure and force created by the recirculating fluid being dispensed from the openings within the dispensing pipes 90, 92, 94 and 96.

From the foregoing discussion, it is apparent that the cleaning apparatus 10 of the present invention can be used to clean and/or treat fruits, vegetables and other articles of agricultural produce such as sweet potatoes or the like. The cleaning apparatus 10 as disclosed herein is relatively inexpensive and simple compared to prior art devices that are designed to accomplish the same function. Of importance to the present invention is the paddle wheel conveying and discharge assembly 42 that engages, transfers, and discharges and sweet potatoes or other articles of produce while minimizing bruising, cutting and scraping of these products. Also, the entire cleaning apparatus 10 can clean itself by spraying down the bottom floor 24, and discharging the slush, including dirt, debris and other foreign material, through the respective discharge openings within the bottom floor by opening the respective gates 32 and allowing the slush material to enter a trough 100 preferably formed thereunder within a concrete floor 98, with the trough inclined such that the entire slush material will gravitate to an appropriate area of collection.

The terms "upper", "lower", "forward", "rearward", etc., have been used herein merely for the convenience of the foregoing specification and in the appended claims to describe the apparatus for washing and/or treating potatoes and other such fruits and vegetables and its parts as oriented in the drawings. It is to be understood, however, that these terms are in no way limiting to the invention since the apparatus for washing and/or treating potatoes and other such fruits and vegetables may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. An apparatus for washing and/or treating material such as fruits, vegetables, and the like comprising: a container structure including bottom and side walls and adapted to hold a volume of fluid therein whereby said container is structured such that the material received therein is generally in contact with the fluid within said container structure; paddle wheel means rotatively mounted within said container structure and cooperable with an adjacent support means for engaging material within said container being washed and/or treated and generally urging said material to move between said paddle wheel means and said support means and lifting said material from said container and the fluid therein such that said material generally moves upwardly between said paddle wheel means and said support means to where the same is deposited outwardly of said contaniner structure where the material is received; drive means for rotatively driving said paddle wheel means such that the material within the container may be moved from said container structure; said paddle wheel means and said cooperable support means extending substantially across an exiting end portion of said container structure, and wherein said paddle wheel means includes a shaft rotatively mounted across said container structure and operatively connected to said drive means whereby said drive means is operative to rotatively drive said shaft; a pair of end plates fixed to opposite portions of said shaft and disposed generally interiorly of the side walls of said container structure; a transverse finger support assembly extending between said end plates and radially spaced from said shaft; and a plurality of finger means generally circumferentially spaced about said finger support assembly and extending therefrom for engaging material being discharged from said container structure; said support means cooperable with said paddle wheel means for discharging material from said container structure extending generally under said paddle wheel means and curves generally upwardly adjacent said exiting end portion of said container with the curved portion thereof being generally radially spaced relative to said transvese finger support assembly of said paddle wheel means such that material may pass between said finger support assembly and said support means as said paddle wheel means is driven; and wherein said finger means extending from said paddle wheel means are of a distance sufficient enough to engage a portion of said cooperable support means during a portion of each revolution of each paddle wheel means, and wherein said finger means are comprised of a flexible material means that yield in a bending fashion as said finger means contacts and engages portions of said cooperable support means as said paddle wheel means is driven.

2. The apparatus of claim 1 wherein the plurality of finger means includes a series of finger strips, with each finger strip extending substantially the entire width between said end plates of said paddle wheel means and including a relatively thin metal strip material and a relatively soft lightweight material overlying and secured above said metal strip material.

3. The apparatus of claim 1 wherein said container structure is provided with a grate assembly disposed over a substantial area within said container structure, and wherein said grate structure forms said cooperable support means underneath and adjacent said paddle wheel means.

4. The apparatus of claim 3 wherein there is provided a pumping system for circulating the fluid within said container structure to and from within said container structure.

5. The apparatus of claim 3 wherein said pumping system comprising at least one pipe extending transversely across said container structure and including a series of axially spaced openings formed therein for dispensing fluid from said pipe into said container structure; and wherein said pipe and openings formed therein is oriented such that fluid exiting therefrom is directed generally towards said paddle wheel means such that the exiting fluid tends to urge and move the material received within said container structure towards said paddle wheel means.

6. The apparatus of claim 1 wherein said bottom of said container structure is provided with at least one generally downwardly sloping clean out area that leads to an exiting opening having gate means associated therewith for opening and closing said exiting opening, whereby dirt, debris and other foreign material may be cleaned from the container structure by spraying the bottom portion therein with water under pressure so as to cause the dirt, debris and other foreign material to move towards said exiting opening where the same exit therethrough when said gate means is opened.

7. An apparatus for receiving and washing and/or treating material such as fruits, vegetables, and the like comprising: a container structure including bottom and side walls and adapted to hold a volume of fluid therein whereby said container is structured such that the material received therein is generally in contact with the fluid within said container structure, said container having a receiving end and an exiting end with said receiving end being substantially wider than said exiting end such that the particular material to be received within said container can be easily and conveniently dumped into said receiving end of said container; paddle wheel means rotatively mounted about said exiting end of said container a substantial distance from said receiving end such that material may be dumped in bulk form in said receiving end and may accumulate and remain in the area between said paddle wheel means and said receiving end of said container; grate means extending about a substantial area of said container and including a generally horizontal grate portion that extends from said receiving end of said container to said paddle wheel means where a portion of said grate means curves adjacent said paddle wheel means such that said paddle wheel means cooperates with the adjacent curved portion of said grate means for engaging the material within said container to be washed and/or treated and generally urges said material to move between said paddle wheel means and the curved portion of said grate means to lift said material from said container; said paddle wheel means and said curved cooperable grate portion of said grate means extending substantially across the exiting end of said container and wherein said paddle wheel means includes a shaft rotatively mounted across said container structure, a pair of end plates fixed to opposite portions of said shaft and disposed interiorly of the side walls of said container structure, and a transverse finger support assembly extending between said end plates and radially spaced from said shaft, and a plurality of flexible and yieldable finger means generally circumferentially spaced about said finger support assembly and extending therefrom for engaging material being transferred between said paddle wheel means and said underlying grate means; and drive means operatively connected to said paddle wheel means for driving said paddle wheel means such that material within said container may be transferred between said paddle wheel means and said grate means and discharged from said container.

8. The apparatus of claim 7 wherein said finger support assembly includes an outer irregularly shaped housing that extends between said end plates, and wherein said outer irregularly shaped housing includes a plurality of circumferentially disposed transverse flat areas for supporting said finger means.

9. The apparatus of claim 7 wherein said finger means extending from said paddle wheel means are of a distance sufficient enough to engage a portion of said grate means underlying said paddle wheel means during a portion of each revolution of said paddle wheel means, and wherein said finger means are comprised of flexible material means that yield in a bending fashion as said finger means contact and engage portions of said cooperable grate means extending adjacent said paddle wheel means.

10. The apparatus of claim 7 wherein the sides of said container includes two generally converging side walls that extends from said receiving end towards said exiting end where said paddle wheel means is disposed.

11. The apparatus of claim 10 wherein there is provided a pumping system for circulating fluid within said container structure to and from within said container structure.

12. The apparatus of claim 7 wherein said bottom of said container structure is provided with at least one generally downwardly sloping clean-out area that leads to an exiting opening having gate means associated therewith for opening and closing said exiting opening, whereby dirt, debris and other foreign material may be cleaned from the container structure by spraying the bottom portion therein with water under pressure so as to cause the dirt, debris and other foreign material to move towards said exiting opening where the same exits therethrough when said gate means is open.

13. An apparatus for receiving material therein such as fruits, vegetables and the like wherein said apparatus is adapted to contain a fluid therein such that said materials may be dumped directly into said apparatus, said apparatus comprising: a container structure having receiving and exiting ends and including bottom and side walls adapted to hold a volume of fluid therein whereby said container is structured such that the material received therein is generally in contact with fluid within said container structure; paddle wheel means rotatively mounted about said exiting end of said container a substantial distance from said receiving end such that material may be dumped in bulk form in said receiving end and made accumulate and remain in the area between said paddle wheel means and said receiving end of said containers; grate means extending about a substantial area of said container and including a generally horizontal grate portion that extends generally from said receiving end of said container to said paddle wheel means; cooperable support means generally curved and disposed adjacent said paddle wheel means for cooperating therewith in the transfer of material from said container, said cooperable support means being curved generally underneath and adjacent said paddle wheel means such that said paddle wheel means cooperates with the adjacent curved portion of said cooperable support means for engaging the material within said container to generally urge said material to move between said paddle wheel means and the curved portion of said cooperable support means to lift the material from the container; said paddle wheel means and said curved cooperable support means extending across the exiting end of said container and wherein said paddle wheel means includes a shaft rotatively mounted across said container structure and a transverse finger support assembly disposed about said shaft, and a plurality of finger means generally circumferentially spaced about said finger support assembly and extending therefrom for engaging material being transferred between said paddle wheel means and said underlying portion of said cooperable support means; drive means operatively connected to said paddle wheel means for driving said paddle wheel means such that the material within said container may be transferred between said paddle wheel means and said adjacent cooperable support means and discharged from said container; and fluid propulsion means associated with said apparatus for generally urging material received about said receiving end of said container towards said paddle wheel means and the exiting end of said container, said fluid propulsion means including a pumping system operative to pump fluid to an area within said container where the fluid is directed towards the material disposed between said receiving end and said paddle wheel means so as to urge the material towards said paddle wheel means and generally towards said exiting end of said container.

14. The apparatus of claim 13 wherein said finger support assembly is circumferentially disposed about said shaft and radially spaced therefrom, and wherein said support assembly is circumferentially continuous and generally irregularly shaped with a plurality of finger seat areas circumferentially defined thereabout where said fingers are transversely supported about said finger support assembly.

15. The apparatus of claim 14 wherein the radius of said finger support assembly generally increases between respective adjacent fingers, and wherein this increase in radius is generally from a lagging finger to a leading finger relative to the direction which said paddle wheel means is driven.

16. The apparatus of claim 13 wherein said fingers supported by said finger support assembly are generally flexible and yieldable and extend from said paddle wheel means such that the outer terminal end of each finger extends a distance such that the outer terminal end is generally tangential to a portion of the underlying cooperable support means during a certain portion of each revolution of said paddle wheel means.

* * * * *